US012019482B2

(12) United States Patent
Feng (10) Patent No.: US 12,019,482 B2
(45) Date of Patent: Jun. 25, 2024

(54) FLEXIBLE DISPLAY PANEL, ELECTRONIC DEVICE, AND HINGE (71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 359 days.

(21) Appl. No.: 17/600,232

(22) PCT Filed: Sep. 1, 2021

(86) PCT No.: PCT/CN2021/115910
§ 371 (c)(1),
(2) Date: Sep. 30, 2021

(87) PCT Pub. No.: WO2023/004924
PCT Pub. Date: Feb. 2, 2023

(65) Prior Publication Data
US 2023/0032306 A1  Feb. 2, 2023

(30) Foreign Application Priority Data
Jul. 30, 2021 (CN) .......................... 202110874242.3

(51) Int. Cl.
G06F 1/16 (2006.01)

(52) U.S. Cl.
CPC .......... *G06F 1/1681* (2013.01); *G06F 1/1616* (2013.01); *G06F 1/1652* (2013.01); *G06F 1/1656* (2013.01)

(58) Field of Classification Search
CPC .... G06F 1/1681; G06F 1/1616; G06F 1/1652; G06F 1/1656; H04M 1/022; H04M 1/0268
See application file for complete search history.

(56) References Cited

U.S. PATENT DOCUMENTS 9,930,794 B2 * 3/2018 Luan .................... H05K 5/0017
10,352,354 B1 7/2019 Hsu et al.
(Continued)

FOREIGN PATENT DOCUMENTS

CN 109469680 A 3/2019
CN 208734715 U 4/2019
(Continued)

Primary Examiner — Sagar Shrestha
(74) Attorney, Agent, or Firm — Rivka Friedman (57) ABSTRACT A flexible display panel, an electronic device, and a hinge are provided. Each adjacent two of support members in the hinge are rotated by a rotation mechanism, and each alternate two of the support members are interlinked by a linkage mechanism. In response to a plurality of support members moving to a first position, the plurality of support members are disposed horizontally, so as to provide a flat support surface for a main body of the flexible display panel, thereby alleviating a problem that a surface of a flexible display panel mechanism before folding does not match a size of a flexible screen in an existing external foldable display device.

18 Claims, 9 Drawing Sheets (56) References Cited

U.S. PATENT DOCUMENTS

| | | | |
|---|---|---|---|
| 10,895,894 B2 * | 1/2021 | Jan .................. | G06F 1/1652 |
| 11,353,931 B2 * | 6/2022 | Hsu .................. | G06F 1/1681 |
| 11,516,931 B2 * | 11/2022 | Kim .................. | G06F 1/1652 |
| 11,531,380 B2 * | 12/2022 | Chi .................. | G06F 1/1681 |
| 11,720,152 B2 * | 8/2023 | Hsu .................. | G06F 1/1681 |
| | | | 16/354 |
| 11,720,153 B2 * | 8/2023 | Hsu .................. | G06F 1/1652 |
| | | | 16/250 |
| 2021/0368032 A1 * | 11/2021 | Liao .................. | G06F 1/1681 |
| 2022/0261046 A1 * | 8/2022 | Im .................. | G06F 1/1616 |
| 2022/0321683 A1 * | 10/2022 | Luo .................. | G06F 1/1683 |
| 2022/0365570 A1 * | 11/2022 | Hsu .................. | G06F 1/1681 |

FOREIGN PATENT DOCUMENTS

| | | |
|---|---|---|
| CN | 208919053 U | 5/2019 |
| CN | 110735847 A | 1/2020 |
| CN | 110784570 A | 2/2020 |
| CN | 111508375 A | 8/2020 |
| CN | 211648768 U | 10/2020 |
| CN | 211693211 U | 10/2020 |
| CN | 211857984 U | 11/2020 |
| CN | 212305396 U | 1/2021 |
| CN | 112303421 A | 2/2021 |
| CN | 112392853 A | 2/2021 |
| CN | 212727085 U | 3/2021 |
| CN | 113314036 A | 8/2021 |
| CN | 113314037 A | 8/2021 |

* cited by examiner

FLEXIBLE DISPLAY PANEL, ELECTRONIC DEVICE, AND HINGE

FIELD OF INVENTION

The present application relates to the field of display technologies, and in particular to a flexible display panel, an electronic device, and a hinge.

BACKGROUND OF INVENTION

With developments of display technologies, foldable display devices have become a major development direction in display industries. Foldable display devices are mainly realized by combination of flexible screens and hinges. Flexible screens are fragile components, which cannot bear large pressure or tension during folding processes. For external foldable display devices, easy size mismatch between a mechanism surface of a display device and a flexible screen before folding is a major problem that needs to be solved urgently for current foldable display devices.

Therefore, a technical problem that a size of a mechanism surface of a display device does not match a size of a flexible screen before folding in existing external foldable display devices needs to be solved.

SUMMARY OF INVENTION

Technical Problems

The present disclosure provides a flexible display panel, an electronic device, and a hinge, so as to alleviate a technical problem that a size of a mechanism surface of a display device does not match a size of a flexible screen before folding in existing external foldable display devices.

Technical Solutions

In order to solve the above problems, technical solutions provided by the present disclosure are as follows:

An embodiment of the present disclosure provides a flexible display panel, comprising a hinge and a flexible display panel main body, wherein the hinge includes:
   a plurality of support members;
   a plurality of rotation mechanisms disposed on one side of the plurality of support members, wherein each of the rotation mechanisms is connected to two adjacent ones of the support members, so that the two adjacent support members rotate relative to each other; and
   a linkage mechanism disposed on the side of the plurality of support members, wherein the linkage mechanism is connected to two alternate ones of the support members, so that the two alternate support members rotate synchronously, and at least one of the support members is disposed between the two alternate support members;
   wherein the flexible display panel main body is located on the other side of the plurality of support members away from the rotation mechanisms and the linkage mechanism; in response to the plurality of support members being in a first position, the flexible display panel main body is in a flat state, and the plurality of support members are disposed horizontally and support the flexible display panel main body.

In the flexible display panel provided by an embodiment of the present disclosure, in response to the plurality of support members being in a second position, the flexible display panel main body is in a bent state, same sides of the plurality of support members at both ends and the plurality of support members in the middle are opposite each other, and the plurality of support members support the flexible display panel main body.

In the flexible display panel provided by an embodiment of the present disclosure, each of the rotation mechanisms includes a first rotation member and a second rotation assembly, the first rotation member and the second rotation assembly are individually connected to the two adjacent support members, and the first rotation member is movably connected to the second rotation assembly.

In the flexible display panel provided by an embodiment of the present disclosure, the second rotation assembly includes a second rotation member and a third rotation member disposed at intervals, the first rotation member is fixedly connected to one of the two adjacent support members, the second rotation member and the third rotation member are fixedly connected to the other of the two adjacent support members, and the first rotation member is slidably connected to the second rotation member and the third rotation member.

In the flexible display panel provided by an embodiment of the present disclosure, the first rotation member is provided with a first arc-shaped chute and a first arc-shaped lug, wherein a second arc-shaped chute is defined by one of the second rotation member and the third rotation member, the other of the second rotation member and the third rotation member is provided with a second arc-shaped lug, the first arc-shaped lug is slidably mounted in the second arc-shaped chute, and the second arc-shaped lug is slidably mounted in the first arc-shaped chute.

In the flexible display panel provided by an embodiment of the present disclosure, the linkage mechanism includes a linkage assembly, and the linkage assembly includes a first linkage member and a second linkage member, wherein the first linkage member is connected to one of the two alternate support members, the second linkage member is connected to the other of the two alternate support members, and the first linkage member is synchronously connected to the second linkage member.

In the flexible display panel provided by an embodiment of the present disclosure, the linkage mechanism further includes a connection assembly, and the connection assembly includes a first connection member and a second connection member, wherein the first connection member is connected to the first linkage member and one of the two alternate support members, and the second connection member is connected to the second linkage member and the other of the two alternate support members.

In the flexible display panel provided by an embodiment of the present disclosure, the first connection member is slidably connected to the first linkage member, and the second connection member is slidably connected to the second linkage member.

In the flexible display panel provided by an embodiment of the present disclosure, a first chute is defined by the first connection member, and a second chute is defined by the second connection member, wherein the first linkage member includes a first circular gear, the second linkage member includes a second circular gear, the first circular gear is meshed with the second circular gear, the first circular gear is provided with a first cylindrical shaft, the second circular gear is provided with a second cylindrical shaft, the first cylindrical shaft is slidably mounted in the first chute, and the second cylindrical shaft is slidably mounted in the second chute.

In the flexible display panel provided by an embodiment of the present disclosure, a number of the plurality of support members is four, and the plurality of support members include a first support member, a second support member, a third support member, and a fourth support member, wherein each of the rotation mechanisms is individually disposed between the first support member and the second support member, which are adjacent to each other, between the second support member and the third support member, which are adjacent to each other, and between the adjacent third support member and the fourth support member, which are adjacent to each other, and the linkage mechanism is individually disposed between the alternate first support member and the third support member, and between the alternate second support member and the fourth support member.

In the flexible display panel provided by an embodiment of the present disclosure, the plurality of rotation mechanisms are disposed alternately, and the plurality of linkage mechanisms are disposed alternately.

An embodiment of the present disclosure further provides an electronic device, comprising the flexible display panel of one of the foregoing embodiments.

An embodiment of the present disclosure further provides a hinge, comprising:

a plurality of support members;

a plurality of rotation mechanisms disposed on one side of the plurality of support members, wherein each of the rotation mechanisms is connected to two adjacent ones of the support members, so that the two adjacent support members rotate relative to each other; and a linkage mechanism disposed on the side of the plurality of support members, wherein the linkage mechanism is connected to two alternate ones of the support members, so that the two alternate support members rotate synchronously, and at least one of the support members is disposed between the two alternate support members;

wherein in response to the plurality of support members being in a first position, the plurality of support members are disposed horizontally, and in response to the plurality of support members being in a second position, same sides of the plurality of support members at both ends and the plurality of support members in the middle are opposite each other.

In the hinge provided by an embodiment of the present disclosure, each of the rotation mechanisms includes a first rotation member and a second rotation assembly, the first rotation member and the second rotation assembly are individually connected to the two adjacent support members, and the first rotation member is movably connected to the second rotation assembly.

In the hinge provided by an embodiment of the present disclosure, the second rotation assembly includes a second rotation member and a third rotation member disposed at intervals, the first rotation member is fixedly connected to one of the two adjacent support members, the second rotation member and the third rotation member are fixedly connected to the other of the two adjacent support members, and the first rotation member is slidably connected to the second rotation member and the third rotation member.

In the hinge provided by an embodiment of the present disclosure, the linkage mechanism includes a linkage assembly, and the linkage assembly includes a first linkage member and a second linkage member, wherein the first linkage member is connected to one of the two alternate support members, the second linkage member is connected to the other of the two alternate support members, and the first linkage member is synchronously connected to the second linkage member.

In the hinge provided by an embodiment of the present disclosure, the linkage mechanism further includes a connection assembly, and the connection assembly includes a first connection member and a second connection member, wherein the first connection member is connected to the first linkage member and one of the two alternate support members, and the second connection member is connected to the second linkage member and the other of the two alternate support members.

In the hinge provided by an embodiment of the present disclosure, a number of the plurality of support members is four, and the plurality of support members include a first support member, a second support member, a third support member, and a fourth support member, wherein each of the rotation mechanisms is individually disposed between the first support member and the second support member, which are adjacent to each other, between the second support member and the third support member, which are adjacent to each other, and between the third support member and the fourth support member, which are adjacent to each other, and the linkage mechanism is individually disposed between the alternate first support member and the third support member, and between the alternate second support member and the fourth support member.

Beneficial Effect

The flexible display panel, the electronic device, and the hinge provided by the present disclosure include the plurality of support members. A rotation mechanism is disposed between each two adjacent ones of the support members, and a linkage mechanism is disposed between each two alternate ones of the support members. The two adjacent support members can be rotated relatively by the rotation mechanism, and the two alternate support members can be rotated synchronously by the linkage mechanism. In response to the plurality of support members moving to the second position by the rotation mechanisms and the linkage mechanisms, the flexible display panel main body is in a bent state, and same sides of the plurality of support members at both ends and the plurality of support members in the middle are opposite each other, so that the plurality of support members form a U-shaped surface and maintain conformity with the bottom of the flexible display panel main body. Thus, the flexible display panel main body is prevented from greatly pulling during the bending process and is supported by a mechanism. In response to the plurality of support members moving to the first position, the flexible display panel main body is in a flat state, and the plurality of support members are arranged horizontally, so as to provide a flat support surface for the flexible display panel main body, and to support the flexible display panel main body, which solves the problem that a mechanism surfaces of the display device does not match a size of the flexible screen before folding in existing external foldable display devices.

DESCRIPTION OF DRAWINGS

In order to illustrate technical solutions in the embodiments or in the prior art more clearly, attached drawings required for describing the embodiments or prior art will be simply explained as below. Apparently, the attached drawings for the following description are only some embodiments of the present disclosure. Those skilled in the art also could derive other attached drawings from these attached drawings without making a creative work.

DETAILED DESCRIPTION OF PREFERRED EMBODIMENTS

The description of the following embodiments refers to the attached drawings to illustrate specific embodiments that can be implemented in the present disclosure. The directional terms mentioned in the present disclosure, such as "upper", "lower", "front", "back", "left", "right", "inner", "outer", and "lateral" merely refer to the directions of the attached drawings. Therefore, the directional terms are used to illustrate and understand the present disclosure, rather than to limit the present disclosure. In the drawings, units with similar structures are indicated by the same reference numerals. In the drawings, for clear understanding and ease of description, thicknesses of some layers and regions are exaggerated. That is, a size and a thickness of each component shown in the drawings are arbitrarily shown, and the present disclosure is not limited thereto.

Figure 1:
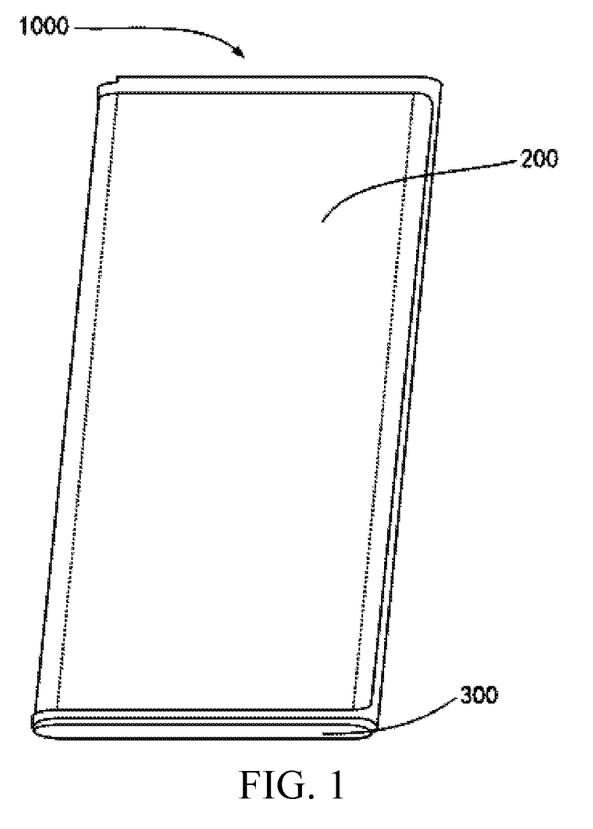
FIG. 1 is a schematic structural diagram of a flexible display panel when the flexible display panel is folded provided by an embodiment of the present disclosure.
Figure 2:
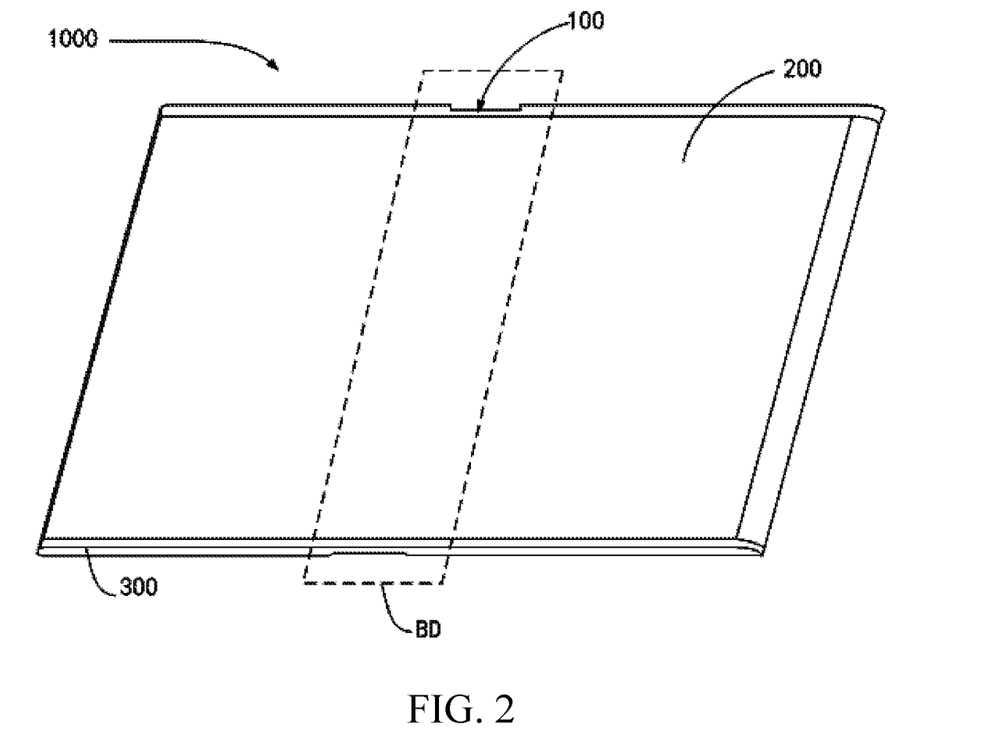
FIG. 2 is a schematic structural diagram of a flexible display panel when the flexible display panel is unfolded provided by an embodiment of the present disclosure.
Figure 3:
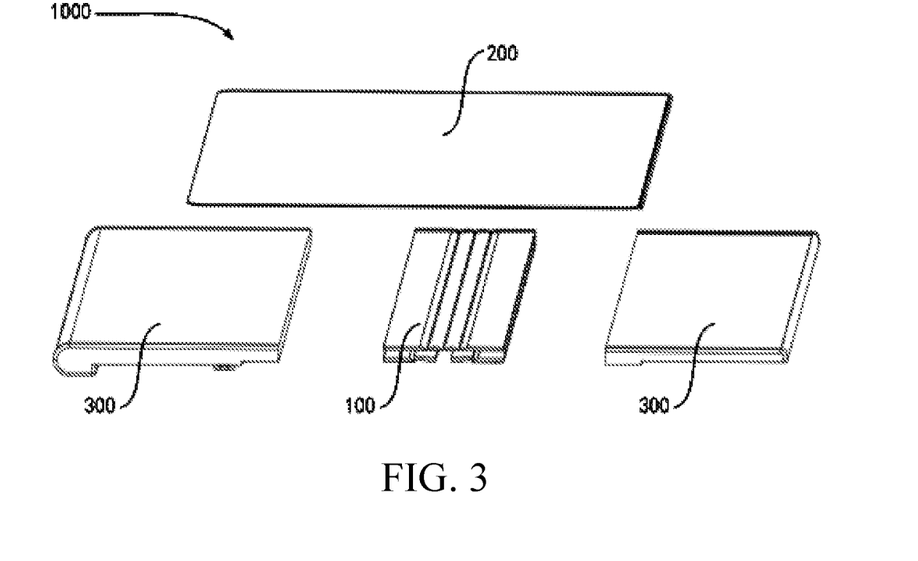
FIG. 3 is an exploded view of a flexible display panel provided by an embodiment of the present disclosure.

Please refer to FIGS. 1 to 3. FIG. 1 is a schematic structural diagram of a flexible display panel when the flexible display panel is folded provided by an embodiment of the present disclosure. FIG. 2 is a schematic structural diagram of a flexible display panel when the flexible display panel is unfolded provided by an embodiment of the present disclosure. FIG. 3 is an exploded view of a flexible display panel provided by an embodiment of the present disclosure. The flexible display panel 1000 includes a hinge 100 and a flexible display panel main body 200. The flexible display panel 1000 includes an organic light-emitting diode (OLED) display panel. The flexible display panel main body 200 may include a flexible substrate, and a driving circuit layer, a light-emitting function layer, and an encapsulation layer, which are sequentially stacked on the flexible substrate, and the like. It can be understood that the flexible display pane main body 200 of the present disclosure may include various functional structures of conventional OLEDs, and is not repeated herein.

Since OLED panels have advantages of flexibility, wearability, etc., the flexible display panel main body 200 can be bent, folded, and rolled following the hinge 100, so that the flexible display panel 1000 is bendable, foldable, and rollable. Certainly, in order to realize rollability of the flexible display panel 1000, an overall length of the hinge 100 must match the flexible display panel main body 200. In an embodiment of the present disclosure, the foldable flexible display panel 1000 is taken as an example for illustration.

The flexible display panel 1000 has a folding area BD, the hinge 100 is disposed corresponding to the folding area BD, and the hinge 100 is fixed on a housing 300 of the flexible display panel 1000. The hinge 100 and the housing 300 support together the flexible display panel main body 200. In a case that the flexible display panel 1000 is used for electronic devices such as mobile phones, the housing 300 may be a middle frame of the mobile phone.

Structure and working principle of the hinge 100 in the present disclosure is described in detail below.

Figure 4:
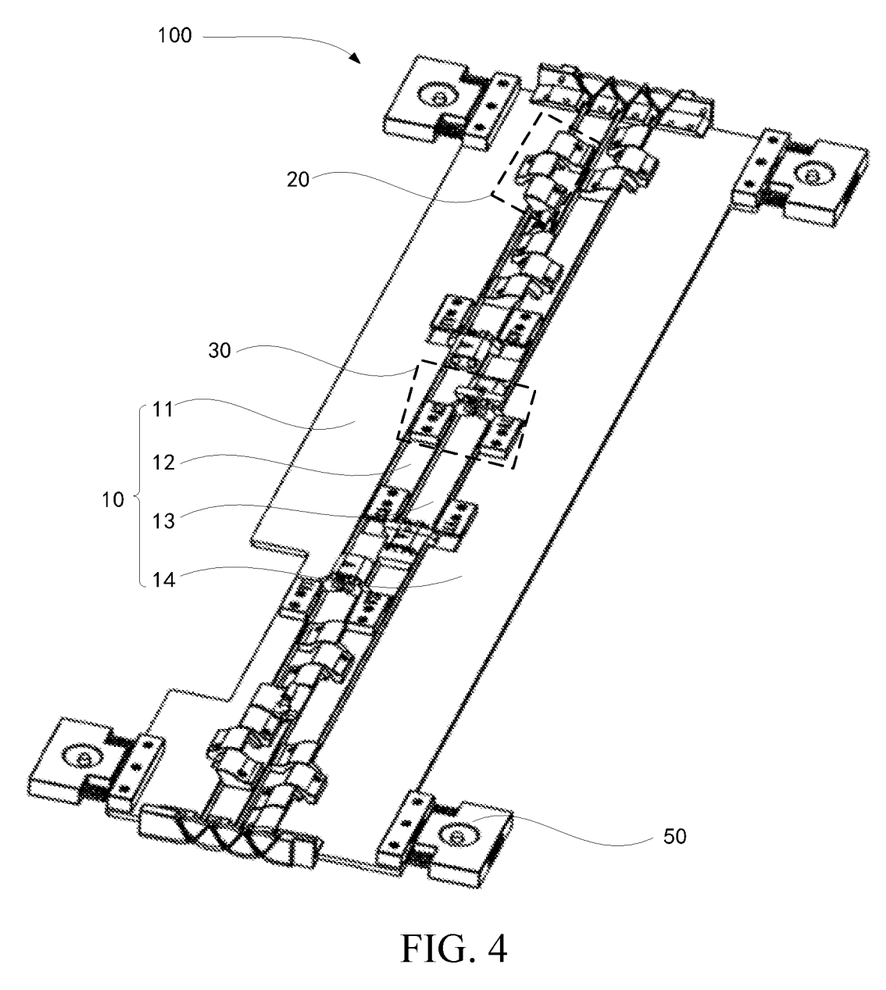
FIG. 4 is a schematic diagram of overall structure of a hinge provided by an embodiment of the present disclosure.
Figure 5:
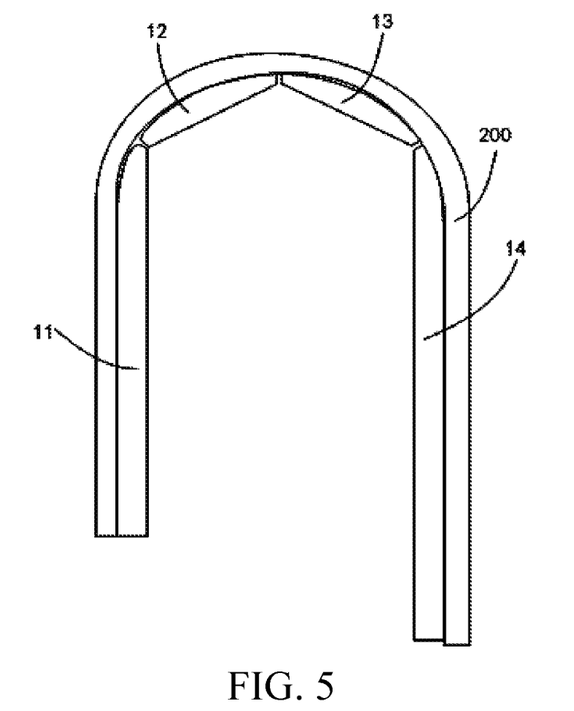
FIG. 5 is a schematic diagram of an arrangement of a support member after the hinge is folded provided by an embodiment of the present disclosure.

Please refer to FIGS. 1 to 5. FIG. 4 is a schematic diagram of overall structure of a hinge provided by an embodiment of the present disclosure. FIG. 5 is an arrangement of a support member after a hinge is folded provided by an embodiment of the present disclosure. The hinge 100 includes a plurality of support members 10, a plurality of rotation mechanisms 20, and a linkage mechanism 30, which are rotatably connected in sequence. As shown in FIG. 4, the plurality of support members 10 may respectively be a first support member 11, a second support member 12, a third support member 13, and a fourth support member 14. The plurality of rotation mechanisms 20 are disposed on one side of the plurality of support members 10, and each of the rotation mechanisms 20 is connected to two adjacent ones of the support members 10, so that the two adjacent support members rotate relative to each other.

The linkage mechanism 30 is disposed on the side of the plurality of support members 10. That is, the linkage mechanism 30 and the rotation mechanisms 20 are disposed on the same side of the plurality of support members 10. The linkage mechanism 30 is connected to two alternate ones of the support members 10, so that the two alternate support members 10 rotate synchronously, and at least one of the support members 10 is disposed between the two alternate support members 10. The two alternate support members 10 refer to two support members which are not adjacent to each other, and other support members are further disposed between the two support members which are not adjacent to each other.

The flexible display panel main body 200 is located on the other side of the plurality of support members 10 away from the rotation mechanisms 20 and the linkage mechanism 30. That is, the flexible display panel main body 200 is located on one side of the support members 10 away from the rotation mechanisms 20 and the linkage mechanism 30.

In response to the plurality of support members 10 are in a first position, the flexible display panel main body 200 is in a flat state, and the plurality of support members 10 are disposed horizontally to form and support the flexible display panel main body 200. The horizontal arrangement of the plurality of support members 10 can form a flat surface, so as to provide a flat support surface for the flexible display panel main body 200.

In response to the plurality of support members 10 moving to a second position, the flexible display panel main body 200 is in a bent state, and same sides of the plurality of support members 10 at both ends and the plurality of support members 10 in the middle are opposite each other, so that the plurality of support members 10 are disposed in a U shape. The flexible display panel main body 200 is attached to a U-shaped outer surface of U-shaped structure formed by the support members 10.

Please refer to FIGS. 4 and 5. It should be noted that the plurality of support members 10 at both ends refer to the support members located at opposite sides in the plurality of support members which are rotatably connected. As shown in FIGS. 4 and 5, the first support member 11 and the fourth support member 14 are the support members located at both ends. The plurality of support members 10 in the middle refer to the support members located between the plurality of support members 10 at both ends. As shown in FIGS. 4 and 5, the second support member 12 and the third support member 13 are located between the first support member 11 and the fourth support member 14. That is, the second support member 12 and the third support member 13 are the support members located in the middle. In response to the plurality of support members 10 are in the second position, the first support member 11 and the fourth support member 14 are located on the same side of the second support member 12 and the third support member 13, and the first support member 11 and the fourth support member 14 are disposed oppositely.

In addition, the second position of the present disclosure refers to a position to which the plurality of support members 10 move in response to the flexible display panel 1000 being in a folded state. The first position refers to a position to which the plurality of support members 10 move in response to the flexible display panel 1000 is being an unfolded state. In response to the plurality of support members 10 moving to the second position, an angle between every two adjacent support members 10 is greater than 90°, so that the plurality of support members 10 form a smooth U-shaped structure as a whole. The flexible display panel main body 200 is attached to an outer surface of the U-shaped structure. Since corners of the U-shaped structure are smooth transition surfaces, the display panel main body 200 can be prevented from greatly pulling during a bending process and can be mechanically supported while the flexible display panel 1000 is folded outwards. In response to the plurality of support members 10 moving to the first position, the plurality of support members 10 are disposed horizontally to form a flat surface for providing a flat support surface for the flexible display panel main body 200, so as to support the flexible display panel main body 200. In this way, the flexible display panel main body 200 and a mechanical surface of the hinge 100 are always attached to each another before and after the flexible display panel 1000 is folded, so that a size of the mechanical surface of the hinge 100 always matches a size of the flexible display panel main body 200.

Figure 6:
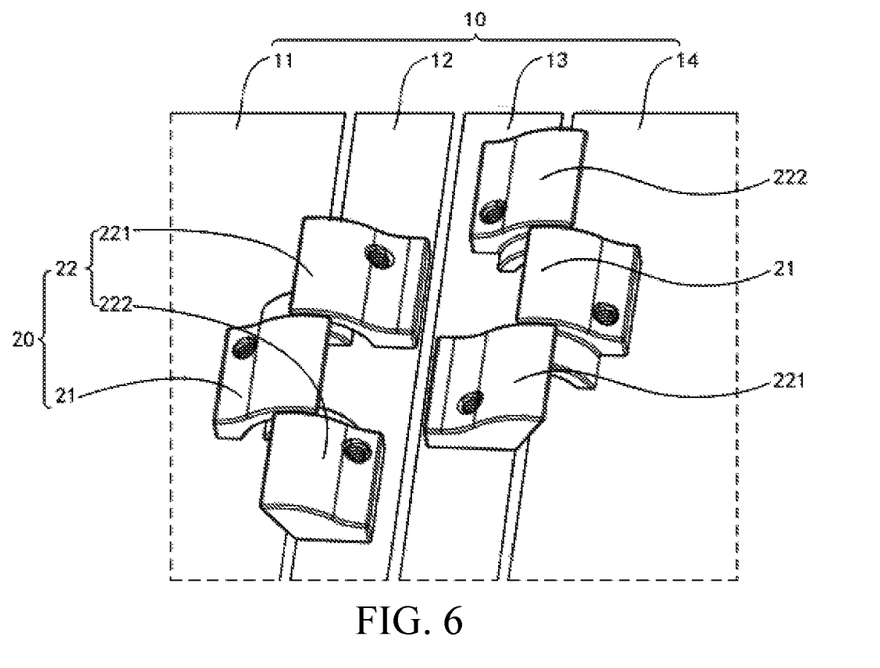
FIG. 6 is an enlarged schematic diagram of each of the rotation mechanisms in FIG. 4.
Figure 7:
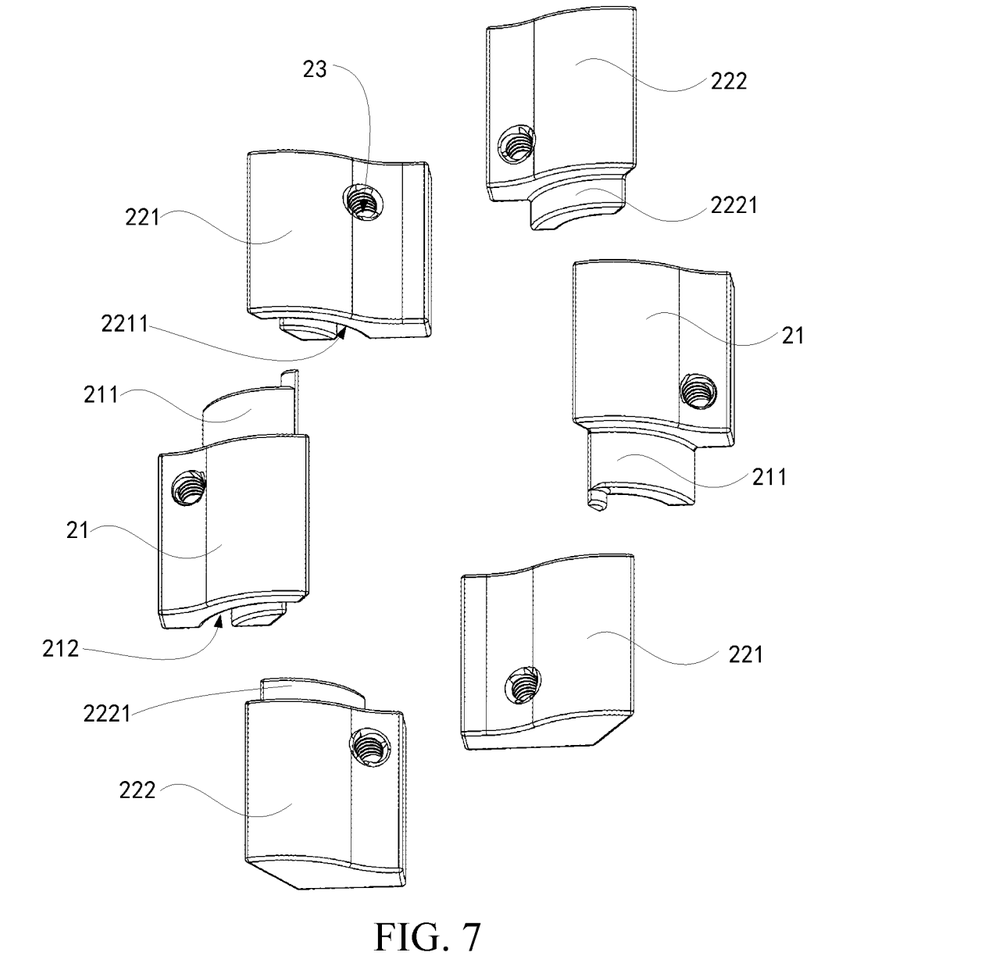
FIG. 7 is a detailed schematic diagram of each of the rotation mechanisms in FIG. 6.
Figure 8:
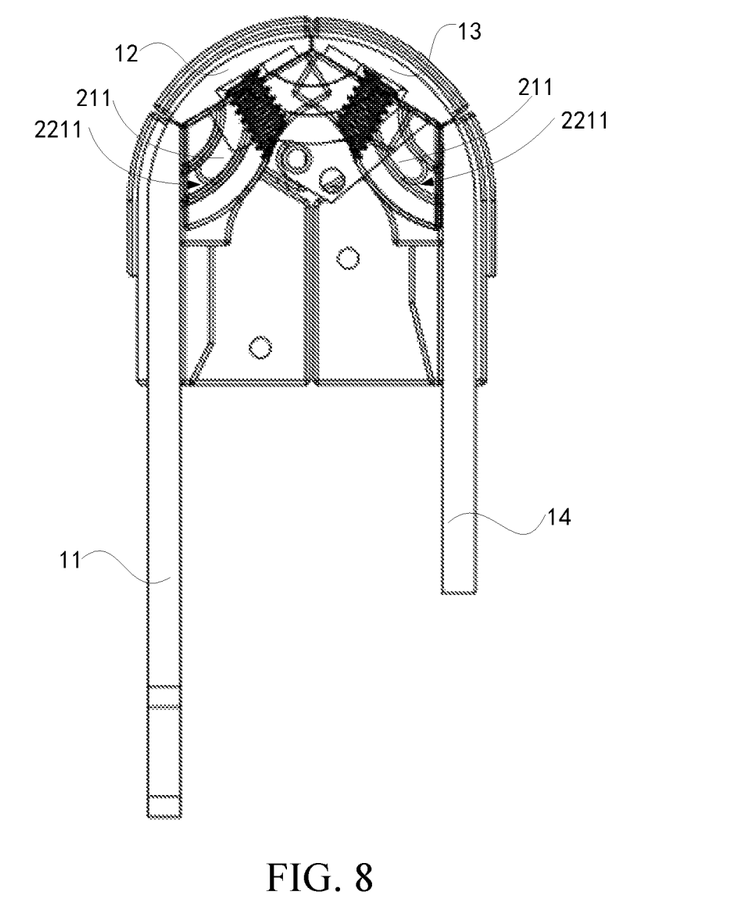
FIG. 8 and FIG. 9 are schematic cross-sectional views of each of the rotation mechanisms in a folded state provided by an embodiment of the present disclosure.
Figure 9:
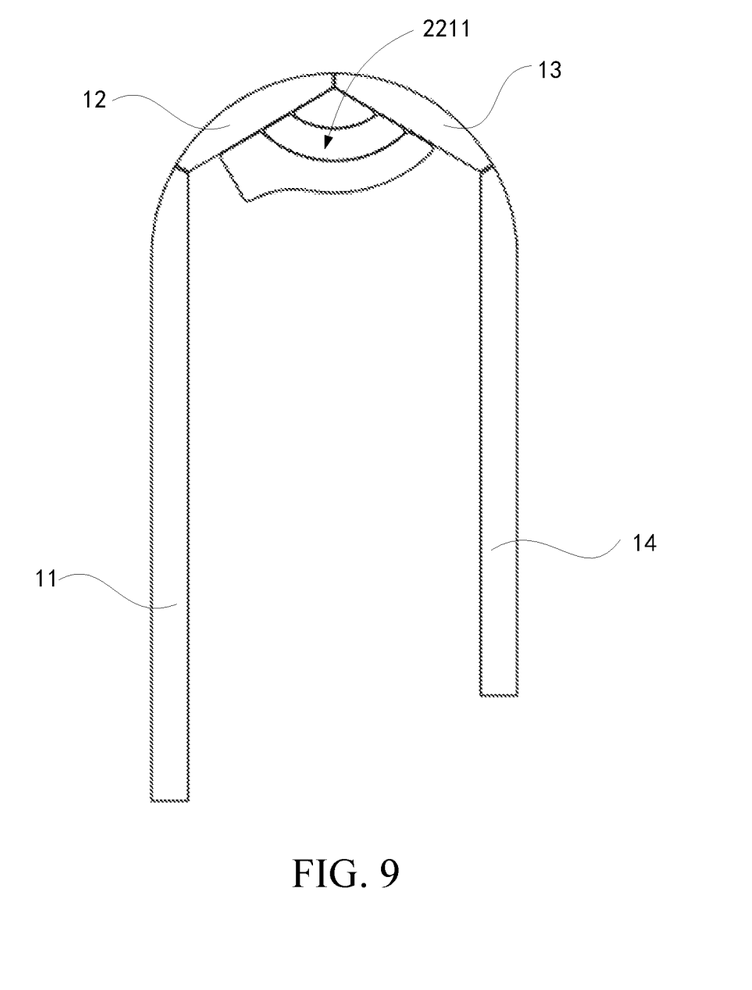

Specifically, please refer to FIGS. 1 to 8. FIG. 6 is an enlarged schematic diagram of each of the rotation mechanisms in FIG. 4. FIG. 7 is a detailed schematic diagram of each of the rotation mechanisms in FIG. 6. FIG. 8 and FIG. 9 are schematic cross-sectional views of each of the rotation mechanisms in a folded state. Each of the rotation mechanisms 20 includes a first rotation member 21 and a second rotation assembly 22, wherein the first rotation member 21 and the second rotation assembly 22 are individually connected to the two adjacent support members 10, and the first rotation member 21 is movably connected to the second rotation assembly 22.

Specifically, the second rotation assembly 22 includes a second rotation member 221 and a third rotation member 222 disposed at intervals, wherein the second rotation member 221 and the third rotation member 222 are fixedly connected to one of the two adjacent support members, and the first rotation member 21 is fixedly connected to the other of the two adjacent support members 10. Specifically, the fixed connection methods include fixed connections by means of pins, bonding, welding, screws, and the like. For example, the first rotation member 21, the second rotation member 221, and the third rotation member in the present embodiment may be individually provided with screw holes 23 and fixed on the corresponding support members 10 by screws. Both the second rotation member 221 and the third rotation member 222 are movably connected to the first rotation member 21.

Specifically, one end of the first rotation member 21 is provided with a first arc-shaped lug 211, and a first arc-shaped chute 212 is defined by the other end of the first rotation member 21. The first arc-shaped lug 211 and the first arc-shaped chute 212 are located on opposite ends of the first rotation member 21. One of the second rotation member 221 and the third rotation member 222 is provided with a second arc-shaped chute 2211, and the other is provided with a second arc-shaped lug 2221. In an embodiment of the present disclosure, the second arc-shaped chute 2211 being defined by the second rotation member 221 and the third rotation member 222 being provided with a second arc-shaped lug 2221 are taken as an example. The first arc-shaped lug 211 of the first rotation member 21 is slidably disposed on the second arc-shaped chute 2211 of the second rotation member 221, and the second arc-shaped lug 2221 of the third rotation member 222 is slidably disposed on the first arc-shaped chute 212 of the first rotation member 21.

In response to the plurality of support members 10 moving to the second position, the first arc-shaped lug 211 of the first rotation member 21 slides into the second arc-shaped chute 2211 of the second rotation member 221, and the second arc-shaped lug of the third rotation member 222 slides into the first arc-shaped chute 212 of the first rotation member 21, so to form the cross-sectional view of each of the rotation mechanisms in the folded state as shown in FIGS. 8 and 9. The first arc-shaped lug 211 sliding into the second arc-shaped chute 2211 is individually taken as an example in FIGS. 8 and 9 for illustration, and only the second arc-shaped chute 2211 is shown in FIG. 9.

Optionally, a number of the rotation mechanisms 20 is at least two to ensure stability of rotation connection between the two adjacent support members 10. However, the present disclosure is not limited to this. A specific number of the rotation mechanisms 20 of the present disclosure may be determined according to a length of the support members 10 and spatial configuration on the support members 10.

Figure 10:
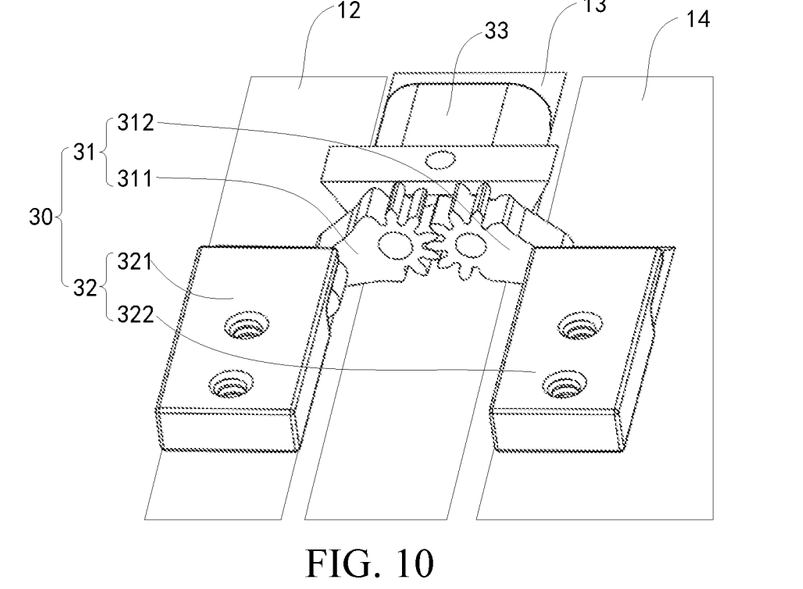
FIG. 10 is an enlarged schematic diagram of a linkage mechanism in FIG. 3.
Figure 11:
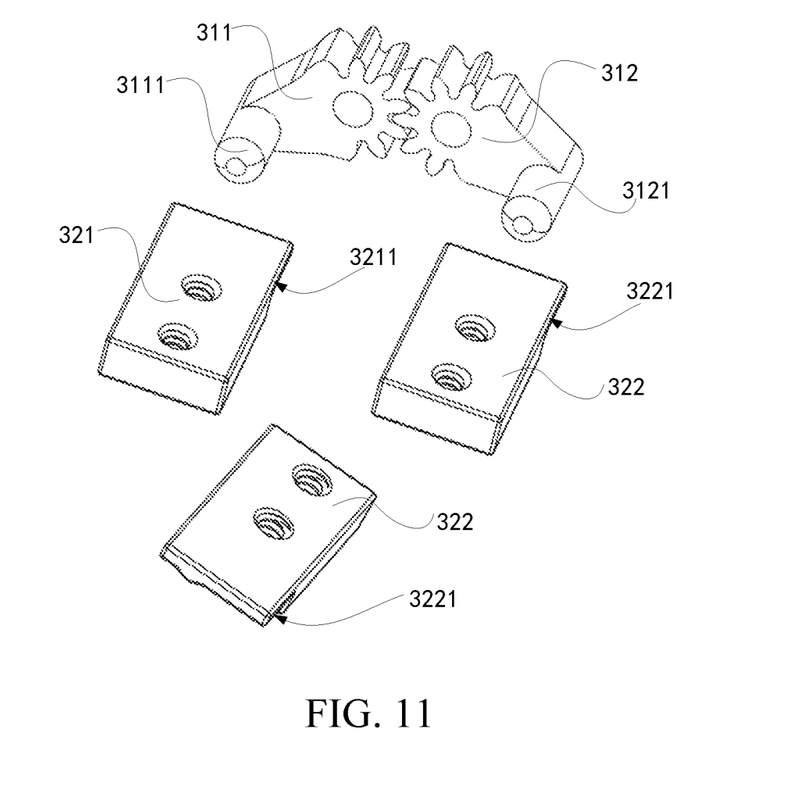
FIG. 11 is a detailed schematic diagram of a linkage mechanism in FIG. 10.
Figure 12:
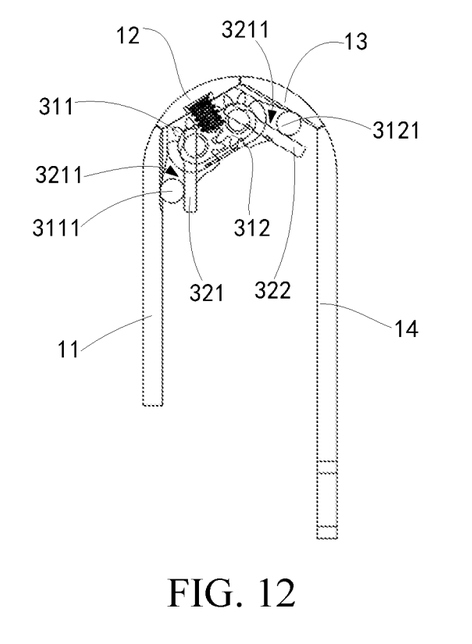
FIG. 12 is a schematic cross-sectional view of a linkage mechanism in a folded state provided by an embodiment of the present disclosure.

Please refer to FIGS. 10 and 12. FIG. 10 is an enlarged schematic diagram of a linkage mechanism in FIG. 4, FIG. 11 is a detailed schematic diagram of a linkage mechanism in FIG. 10, and FIG. 12 is a schematic cross-sectional view of a linkage mechanism in a folded state. The linkage mechanism 30 includes a linkage assembly 31 which includes a first linkage 311 and a second linkage 312, wherein the first linkage 311 is connected to one of the two alternate support members 10, the second linkage 312 is connected to the other of the two alternate support members 10, and the first linkage 311 is synchronously connected to the second linkage 312.

The linkage mechanism 30 further includes a connection assembly 32 which includes a first connection member 321 and a second connection member 322, wherein the first connection member 321 is connected to the first linkage member 311 and one of the two alternate support members 10, and the second connection member 322 is connected to the second linkage member 312 and the other of the two alternate support members 10.

Optionally, the linkage mechanism 30 further includes a synchronization assembly 33 which may be fixedly connected to the support member 10 between the two alternate support members 10. Moreover, the synchronization assembly 33 is further movably connected the first linkage member 311 and the second linkage member 312, so that the first linkage member 311 and the second linkage member 312 rotate synchronously. The first connection member 321 is slidably connected to the first linkage member 311, and the second connection member 322 is slidably connected to the second linkage member 312. In addition, both the first connection member 321 and the second connection member 322 may be fixedly connected to the corresponding support members 10. The fixed connection methods include fixed connections by means of pins, bonding, welding, screws, and the like. In this way, synchronous rotation of the first linkage 311 and the second linkage 312 can drive the alternate support members 10 and the support member 10 between the two alternate support members 10 to rotate synchronously.

Specifically, a first chute 3211 is defined by the first connection member 321, and a second chute 3221 is defined by the second connection member 322. The first linkage 311 includes a first circular gear, and the second linkage member 312 includes a second circular gear, wherein the first circular gear is meshed with the second circular gear. The first circular gear is provided with a first cylindrical shaft 3111, and the second circular gear is provided with a second cylindrical shaft 3121. The first cylindrical shaft 3111 is slidably mounted the first chute 3211, and the second cylindrical shaft 3121 is slidably mounted in the second chute 3221. In response to the plurality of support members 10 moving to the second position, the linkage mechanism forms a structure as shown in the schematic cross-sectional view in FIG. 12.

Optionally, a number of the linkage mechanism 30 is at least two to ensure stability of linkage of the two alternate support members 10 and the support member 10 between the two alternate support members 10. However, the present disclosure is not limited to this. A specific number of the linkage mechanism 30 of the present disclosure may be determined according to a length of the support members 10 and spatial configuration on the support members 10.

Please refer to FIGS. 4 to 12. In an embodiment of the present disclosure, a number of the support members 10 being four is taken as an example to further illustrate structure and working principle of the hinge 100. The plurality of support members 10 includes a first support member 11, a second support member 12, a third support member 13, and a fourth support member 14. Each of the rotation mechanisms 20 is individually disposed between the first support member 11 and the second support member 12, which are adjacent to each other, between the second support member 12 and the third support member 13, which are adjacent to each other, and between the third support member 13 and the fourth support member 14, which are adjacent to each other. The linkage mechanism 30 is individually disposed between the alternate first support member 11 and the third support member 13, and between the alternate second support member 12 and the fourth support member 14. The second support member 12 is disposed between the alternate first support member 11 and the third support member 13, and the third support member 13 is disposed between the alternate second support member 12 and the fourth support member 14.

Specifically, each of the rotation mechanisms 20 being provided between the first support member 11 and the second support member 12 is taken as an example for illustration. Each of the rotation mechanisms 20 includes a first rotation member 21 and a second rotation assembly 22. The second rotation assembly 22 includes a second rotation member 221 and a third rotation member 222. The first rotation member 21 is fixed to the first support member 11, the second rotation member 221 and the third rotation member 222 are fixed to the second support member 12, and the first rotation member 21 is slidably connected to the third rotation member 222 and the second rotation member 221.

Optionally, the first rotation member 21 is provided with a first arc-shaped lug 211 and a first arc-shaped chute 212. The third rotation member 222 is provided with a second arc-shaped lug 2221. A second arc-shaped chute 2211 is defined by the second rotation member 221. The first arc-shaped lug 211 is slidingly engaged with the second arc-shaped chute 2211, so that the first rotation member 21 can slide relative to the second rotation member 221. The second arc-shaped lug 2221 is slidingly engaged with the first arc-shaped chute 212, so that the first rotation member 21 can slide relative to the third rotation member 222. In this way, the first support member 11 can rotate relative to the second support member 12, and a center of rotation is an arc center of each arc-shaped chute or arc-shaped lug of the rotation mechanisms 20.

For structure and working principle of each of the rotation mechanisms 20 disposed between the second support member 12 and the third support member 13 and disposed between the third support member 13 and the fourth support member 14, refer to the description for each of the rotation mechanisms 20 between the first support member 11 and the second support member 12, which will not be repeated herein.

Optionally, each of the rotation mechanisms 20 between the adjacent support members 10 are staggered. For example, each of the rotation members of the rotation mechanisms 20 between the first support member 11 and the second support member 12 and each of the rotation members of the rotation mechanisms 20 between the third support member 13 and the fourth support member 14 are staggered, so as to avoid interference between the rotation mechanisms 20. Moreover, a limited space on the support members 10 can be reasonably used.

Further, the linkage mechanism 30 between the alternate second support member 12 and the fourth support member 14 is taken as an example for illustration. The linkage mechanism 30 includes a linkage assembly 31, a connection assembly 32, and a synchronization assembly 33. The linkage assembly 31 is movably connected to the third support member 13, and the connection assembly 32 is fixedly connected to the second support member 12 and the fourth support member 14, respectively, and is slidably connected to the linkage assembly 31. The synchronization assembly 33 is fixedly connected to the third support member 13, and the linkage assembly 31 is movably connected to the synchronization assembly 33. The fixed connection methods mentioned above include fixed connections by means of pins, bonding, welding, screws, and the like.

Optionally, the linkage assembly 31 includes a first linkage 311 and a second linkage 312, wherein the first linkage 311 includes a first circular gear, the second linkage 312 includes a second circular gear, and the first linkage 312 includes a first circular gear, and the first circular gear is meshed with the second circular gear, and the first linkage 311 and the second linkage 312 are movably connected to the synchronization assembly 33, so that the first linkage 311 and the second linkage 312 can rotate synchronously relative to the third support member 13. One end of the first circular gear away from a meshed position is provided with a first cylindrical shaft 3111, and one end of the second circular gear away from the meshed position is provided with a second cylindrical shaft 3121.

The connection assembly 32 includes a first connection member 321 and a second connection member 322, wherein a first chute 3211 is defined by the first connection member 321, and a second chute 3221 is defined by the second connection member 322. The first cylindrical shaft 3111 is slidably mounted in the first chute 3211, and the second cylindrical shaft 3121 is slidably mounted in the second chute 3221, so that the first cylindrical shaft 3111 can slide and rotate in the first chute 3211, and the second cylindrical shaft 3121 can slide and rotate in the second chute 3221. Moreover, since the first circular gear and the second circular gear are meshed with each other and can rotate relative to the third support member 13, the second support member 12, the third support member 13, and the fourth support member 14 can be synchronously interlinked, and the second support member 12 and the fourth support member 14 always maintain a symmetrical rotation relative to the third support member 13.

Optionally, the first connection member 321 and the second connection member 322 may further be provided with a stopper (not shown) individually, wherein the stoppers are located on two ends of the first chute 3211 and on two ends of the second chute 3221, and are integrally formed with the first connection member 321 and the second connection member 322. Certainly, the present disclosure is not limited to this. The stoppers of the present disclosure may further be provided individually. The stoppers are used to limit sliding distances of the first cylindrical shaft 3111 and the second cylindrical shaft 3121 in the corresponding chutes, so as to position rotation angles of the two adjacent support members 10.

Correspondingly, structure and linkage principle of the linkage mechanism 30 between the alternate first support member 11 and the third support member 13 are the same as structure and linkage principle of the linkage mechanism 30 between the alternate second support member 12 and the fourth support member 14. Accordingly, the second support member 12, the third support member 13, and the first support member 11 are interlinked, and the first support member 11 and the third support member 13 always maintains a symmetrical rotation relative to the second support member 12.

Optionally, the plurality of linkage mechanisms 30 are disposed in a staggered manner, so as to avoid interference between the plurality of linkage mechanisms 30. Moreover, a limited space on the support members 10 can be reasonably used.

Furthermore, by actions of the rotation mechanisms 20 and the linkage mechanisms 30, when the first support member 11 rotates relative to the second support member 12, the first support member 11 rotates relative to the third support member 13, and the third support member 13 is pushed to rotate relative to the second support member 12 by a sliding fit. Correspondingly, when the fourth support member 14 rotates relative to the third support member 13, a relative sliding occurs between the fourth support member 14 and the second support member 12, and the second support member 12 is pushed to rotate relative to the third support member 13 by a sliding fit. Therefore, the first support member 11, the second support member 12, the third support member 13, and the fourth support member 14 in the hinge 100 can act synchronously during this process.

Therefore, in response to the first support member 11, the second support member 12, the third support member 13, and the fourth support member 14 moving to the second position, each of included angles between the two adjacent support members 10 can be equal, and is greater than 90°. Moreover, the first support member 11, the second support member 12, the third support member 13, and the fourth support member 14 are arranged in a U shape, wherein the first support member 11 and the fourth support member 14 are disposed oppositely.

Moreover, in response to the first support member 11, the second support member 12, the third support member 13, and the fourth support member 14 moving to the first position, each of included angles between the two adjacent support members 10 is still equal to each other, and is 180°. Moreover, the first support member 11, the second support member 12, the third support member 13, and the fourth support member 14 are generally arranged horizontally, so as to provide a flat support surface for the flexible display panel main body 200.

In an embodiment, the flexible display panel 1000 further includes fixing members 50 connected to the hinge 100 and the housings 300. Specifically, the first support member 11 and the fourth support member 14 are individually fixedly connected to the corresponding housings 300 by the fixing members 50.

Optionally, the fixing members 50 may further be formed with the corresponding support members 10 or the housings 300 integrally. For example, the fixing members 50 and the first support member 11 are integrally formed, and the fixing members 50 fixedly connected to the housings 300. The fixed connection method includes fixed connections by means of pins, bonding, welding, screws, and the like.

It should be noted that only the hinge 100 including 4 support members 10 is taken as an example for the embodiment of the present disclosure. However, the present disclosure is not limited to this. The hinge 100 of the present disclosure may further be provided with more support members 10 than 4 support members 10, for example, 5 or 6 support members 10, etc. A rollable display device including the flexible display panel 1000 may also be realized with more support members 10.

In addition, the rotation mechanisms 20 and the linkage mechanisms 30 of the hinge 100 of the present disclosure are not limited to those illustrated in the above-mentioned embodiments, as long as the hinge 100 of the present disclosure may form a flat support surface on the first position and a U-shaped surface on the second position by the actions of the rotation mechanisms 20 and the linkage mechanisms 30. For example, the rotation between the two adjacent support members 10 by the rotation mechanisms 20 of the hinge 100 of the present disclosure can further be realized by structural components such as hinges, links, circular gears, and the like.

In an embodiment, the present disclosure further provides an electronic device. The electronic device includes the flexible display panel of one of the above embodiments, so that the electronic device can be foldable, rollable, etc., and a mechanism surface of a hinge of the flexible display panel matches a size of a flexible display panel main body before and after the electronic device is folded or rolled. The electronic device may be electronic products such as mobile phones and tablets.

Based on the same inventive concept, the present disclosure further provides a hinge which includes the hinge on the flexible display panel described in the foregoing embodiments, and is not be repeated herein.

According to the above embodiment, it can be seen that:

The present disclosure provides a flexible display panel which includes a hinge and a flexible display panel main body. The hinge includes a plurality of support members, rotation mechanisms, and linkage mechanisms, which are rotatably connected in sequence. The rotation mechanisms are disposed on one side of the plurality of support members. Each of the rotation mechanisms is connected to two adjacent ones of the support members, so that the two adjacent support members rotate relative to each other. The linkage mechanisms are disposed on the side of the plurality of support members, wherein the linkage mechanism is connected to two alternate ones of the support members, so that the two alternate support members rotate synchronously. The flexible display panel main body is located on one side of the plurality of support members away from the rotation mechanisms. In response to the plurality of support members moving to the second position by rotation and linkage, the flexible display panel main body is in a bent state, and same sides of the plurality of support members at both ends and the plurality of support members in the middle are opposite each other, so that the plurality of support members 10 are arranged in a U shape. The plurality of support members form a U-shaped surface and maintain a fit with the bottom of the flexible display panel main body, so that the flexible display panel main body is prevented from greatly pulling during the bending process and is supported by a mechanism. In response to the plurality of support members moving to the first position, the plurality of support members are arranged horizontally to provide a flat support surface for the flexible display panel main body, so to support the flexible display panel main body, which solves a problem of that a mechanism surface of a display device does not match a size of the flexible screen before folding in existing external foldable display devices.

In the foregoing embodiments, descriptions of the various embodiments have respective different emphases, and a part in some embodiment, which is not described in detail may be referred to the related description of other embodiments.

The embodiments of the present disclosure are described in detail above, and specific examples are used herein to explain principles and implementations of the present disclosure. The illustration of the above embodiments is merely used to help understand the technical solutions and core ideas of the present disclosure. It should be understood by those skilled in the art that modifications to the technical solutions or equivalent replacements to some of the technical features described in the foregoing embodiments can be made by those skilled in the art without departing from the spirit and scope of the embodiments of the present disclosure.

What is claimed is:

1. A flexible display panel, comprising a hinge and a flexible display panel main body, wherein the hinge includes:
   a plurality of support members;
   a plurality of rotation mechanisms disposed on one side of the plurality of support members, wherein each of the rotation mechanisms is connected to two adjacent ones of the support members, so that the two adjacent support members rotate relative to each other; and
   a linkage mechanism disposed on the side of the plurality of support members, wherein the linkage mechanism is connected to two alternate ones of the support members, so that the two alternate support members rotate synchronously, and at least one of the support members is disposed between the two alternate support members; the two alternate support members comprise at most a side-most one of the support members, the linkage mechanism includes a linkage assembly, and the linkage assembly includes a first linkage member and a second linkage member, wherein the first linkage member is connected to one of the two alternate support members, the second linkage member is connected to an other of the two alternate support members, and the first linkage member is synchronously connected to the second linkage member;
   wherein the linkage mechanism further comprises a synchronization assembly fixedly connected to one of the at least one support members, and the synchronization assembly is movable connected with the first linkage member and the second linkage member;
   wherein the flexible display panel main body is located on the other side of the plurality of support members away from the rotation mechanisms and the linkage mechanism; in response to the plurality of support members being in a first position, the flexible display panel main body is in a flat state, and the plurality of support members are disposed horizontally and support the flexible display panel main body.

2. The flexible display panel of claim 1, wherein in response to the plurality of support members being in a second position, the flexible display panel main body is in a bent state, same sides of the plurality of support members at both ends and the plurality of support members in the middle are opposite each other, and the plurality of support members support the flexible display panel main body.

3. The flexible display panel of claim 1, wherein each of the rotation mechanisms includes a first rotation member and a second rotation assembly, the first rotation member and the second rotation assembly are individually connected to the two adjacent support members, and the first rotation member is movably connected to the second rotation assembly.

4. The flexible display panel of claim 3, wherein the second rotation assembly includes a second rotation member and a third rotation member disposed at intervals, the first rotation member is fixedly connected to one of the two adjacent support members, the second rotation member and the third rotation member are fixedly connected to the other of the two adjacent support members, and the first rotation member is slidably connected to the second rotation member and the third rotation member.

5. The flexible display panel of claim 4, wherein the first rotation member is provided with a first arc-shaped chute and a first arc-shaped lug, wherein a second arc-shaped chute is defined by one of the second rotation member and the third rotation member, the other of the second rotation member and the third rotation member is provided with a second arc-shaped lug, the first arc-shaped lug is slidably mounted in the second arc-shaped chute, and the second arc-shaped lug is slidably mounted in the first arc-shaped chute.

6. The flexible display panel of claim 1, wherein the linkage mechanism further includes a connection assembly, and the connection assembly includes a first connection member and a second connection member, wherein the first connection member is connected to the first linkage member and one of the two alternate support members, and the second connection member is connected to the second linkage member and the other of the two alternate support members.

7. The flexible display panel of claim 6, wherein the first connection member is slidably connected to the first linkage member, and the second connection member is slidably connected to the second linkage member.

8. The flexible display panel of claim 7, wherein a first chute is defined by the first connection member, and a second chute is defined by the second connection member, wherein the first linkage member includes a first circular gear, the second linkage member includes a second circular gear, the first circular gear is meshed with the second circular gear, the first circular gear is provided with a first cylindrical shaft, the second circular gear is provided with a second cylindrical shaft, the first cylindrical shaft is slidably mounted in the first chute, and the second cylindrical shaft is slidably mounted in the second chute.

9. The flexible display panel of claim 1, wherein a number of the plurality of support members is four, and the plurality of support members include a first support member, a second support member, a third support member, and a fourth support member, wherein each of the rotation mechanisms is individually disposed between the first support member and the second support member, which are adjacent to each other, between the second support member and the third support member, which are adjacent to each other, and between the adjacent third support member and the fourth support member, which are adjacent to each other, and the linkage mechanism is individually disposed between the alternate first support member and the third support member, and between the alternate second support member and the fourth support member.

10. The flexible display panel of claim 9, wherein the plurality of rotation mechanisms are disposed alternately, and the plurality of linkage mechanisms are disposed alternately.

11. An electronic device, comprising a flexible display panel, comprising a hinge and a flexible display panel main body, wherein the hinge includes:
a plurality of support members;
a plurality of rotation mechanisms disposed on one side of the plurality of support members, wherein each of the rotation mechanisms is connected to two adjacent ones of the support members, so that the two adjacent support members rotate relative to each other; and
a linkage mechanism disposed on the side of the plurality of support members, wherein the linkage mechanism is connected to two alternate ones of the support members, so that the two alternate support members rotate synchronously, and at least one of the support members is disposed between the two alternate support members; the two alternate support members comprise at most a side-most one of the support members, the linkage mechanism includes a linkage assembly, and the linkage assembly includes a first linkage member and a second linkage member, wherein the first linkage member is connected to one of the two alternate support members, the second linkage member is connected to an other of the two alternate support members, and the first linkage member is synchronously connected to the second linkage member;
wherein the linkage mechanism further comprises a synchronization assembly fixedly connected to one of the at least one support members, and the synchronization assembly is movable connected with the first linkage member and the second linkage member;
wherein the flexible display panel main body is located on the other side of the plurality of support members away from the rotation mechanisms and the linkage mechanism; in response to the plurality of support members being in a first position, the flexible display panel main body is in a flat state, and the plurality of support members are disposed horizontally and support the flexible display panel main body.

12. A hinge, comprising:
a plurality of support members;
a plurality of rotation mechanisms disposed on one side of the plurality of support members, wherein each of the rotation mechanisms is connected to two adjacent ones of the support members, so that the two adjacent support members rotate relative to each other; and
a linkage mechanism disposed on the side of the plurality of support members, wherein the linkage mechanism is connected to two alternate ones of the support members, so that the two alternate support members rotate synchronously, and at least one of the support members is disposed between the two alternate support members; the two alternate support members comprise at most a side-most one of the support members, the linkage mechanism includes a linkage assembly, and the linkage assembly includes a first linkage member and a second linkage member, wherein the first linkage member is connected to one of the two alternate support members, the second linkage member is connected to an other of the two alternate support members, and the first linkage member is synchronously connected to the second linkage member;
wherein the linkage mechanism further comprises a synchronization assembly fixedly connected to one of the at least one support members, and the synchronization assembly is movable connected with the first linkage member and the second linkage member;
wherein in response to the plurality of support members being in a first position, the plurality of support members are disposed horizontally, and in response to the plurality of support members being in a second position, same sides of the plurality of support members at both ends and the plurality of support members in the middle are opposite each other.

13. The hinge of claim 12, wherein each of the rotation mechanisms includes a first rotation member and a second rotation assembly, the first rotation member and the second rotation assembly are individually connected to the two adjacent support members, and the first rotation member is movably connected to the second rotation assembly.

14. The hinge of claim 13, wherein the second rotation assembly includes a second rotation member and a third rotation member disposed at intervals, the first rotation member is fixedly connected to one of the two adjacent support members, the second rotation member and the third rotation member are fixedly connected to the other of the two adjacent support members, and the first rotation member is slidably connected to the second rotation member and the third rotation member.

15. The hinge of claim 14, wherein the first rotation member is provided with a first arc-shaped chute and a first arc-shaped lug, wherein a second arc-shaped chute is defined by one of the second rotation member and the third rotation member, the other of the second rotation member and the third rotation member is provided with a second arc-shaped lug, the first arc-shaped lug is slidably mounted in the second arc-shaped chute, and the second arc-shaped lug is slidably mounted in the first arc-shaped chute.

16. The hinge of claim 12, wherein the linkage mechanism further includes a connection assembly, and the connection assembly includes a first connection member and a second connection member, wherein the first connection member is connected to the first linkage member and one of the two alternate support members, and the second connection member is connected to the second linkage member and the other of the two alternate support members.

17. The hinge of claim 16, wherein a first chute is defined by the first connection member, and a second chute is defined by the second connection member, wherein the first linkage member includes a first circular gear, the second linkage member includes a second circular gear, the first circular gear is meshed with the second circular gear, the first circular gear is provided with a first cylindrical shaft, the second circular gear is provided with a second cylindrical shaft, the first cylindrical shaft is slidably mounted in the first chute, and the second cylindrical shaft is slidably mounted in the second chute.

18. The flexible display panel of claim 12, wherein a number of the plurality of support members is four, and the plurality of support members include a first support member, a second support member, a third support member, and a fourth support member, wherein each of the rotation mechanisms is individually disposed between the first support member and the second support member, which are adjacent to each other, between the second support member and the third support member, which are adjacent to each other, and between the third support member and the fourth support member, which are adjacent to each other, and the linkage mechanism is individually disposed between the alternate first support member and the third support member, and between the alternate second support member and the fourth support member.

\* \* \* \* \*